US007759622B2

(12) United States Patent
Nishimura

(10) Patent No.: US 7,759,622 B2
(45) Date of Patent: Jul. 20, 2010

(54) METHODS AND APPARATUS FOR REGULATING THE DRIVE CURRENTS OF A PLURALITY OF LIGHT EMITTERS

(75) Inventor: Ken A. Nishimura, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 837 days.

(21) Appl. No.: 10/938,998

(22) Filed: Sep. 10, 2004

(65) Prior Publication Data

US 2006/0054776 A1 Mar. 16, 2006

(51) Int. Cl.
*G01J 1/44* (2006.01)

(52) U.S. Cl. ....................................... 250/206; 250/205

(58) Field of Classification Search ................. 250/205, 250/206, 216
See application file for complete search history.

(56) References Cited

U.S. PATENT DOCUMENTS

| | | | | |
|---|---|---|---|---|
| 3,967,111 | A * | 6/1976 | Brown | 250/206 |
| 6,222,172 | B1 * | 4/2001 | Fossum et al. | 250/205 |
| 6,344,641 | B1 | 2/2002 | Blalock et al. | |
| 6,448,550 | B1 | 9/2002 | Nishimura | |
| 6,507,159 | B2 | 1/2003 | Muthu | |
| 6,596,977 | B2 * | 7/2003 | Muthu et al. | 250/205 |
| 6,614,387 | B1 * | 9/2003 | Deadman | 342/70 |
| 2002/0113192 | A1 * | 8/2002 | Antila | 250/205 |
| 2003/0222587 | A1 * | 12/2003 | Dowling et al. | 315/149 |

FOREIGN PATENT DOCUMENTS

| | | |
|---|---|---|
| EP | 1152642 | 11/2001 |
| WO | WO-02/052902 | 7/2002 |
| WO | WO-02/080625 | 10/2002 |
| WO | WO-03/037042 | 5/2003 |

OTHER PUBLICATIONS

University of Michigan-Dearborn, College of Engineering and Computer Science, "Kasami codes, Haddamarand-Walsh sequences, and Barker Sequences," Nov. 12, 2002, www-personal.engin.umd.umich.edu/~richarpc/ch6_wlan.pdf.*

Ken A. Nishimura, "Feed-Forward Methods and Apparatus for Setting the Light Intensities of One or More Leds", U.S. Appl. No. 10/897,892, filed Jul. 23, 2004, 21 pages of specification including claims and abstract, and three sheets for formal drawings.

* cited by examiner

*Primary Examiner*—Georgia Y Epps
*Assistant Examiner*—Kevin Wyatt

(57) ABSTRACT

In one embodiment, ones of a plurality of drive currents are modulated in accordance with ones of a plurality of unique modulation sequences. The modulated drive currents are then applied to a plurality of light emitters. Thereafter, a stream of optical measurements is obtained from a photosensor that is positioned to sense the aggregate light emitted by the light emitters. The stream of optical measurements is then correlated with the modulation sequences to extract optical responses to each of the plurality of drive currents. Finally, each drive current is regulated based on its relationship to its corresponding optical response. Related apparatus, and other methods for regulating the drive currents of a plurality of light emitters, is also disclosed.

20 Claims, 2 Drawing Sheets

METHODS AND APPARATUS FOR REGULATING THE DRIVE CURRENTS OF A PLURALITY OF LIGHT EMITTERS

BACKGROUND

Devices capable of producing light of different wavelengths (e.g., devices comprised of solid-state light emitters such as light emitting diodes (LEDs), or devices comprised of gas discharge lamps) have allowed the construction of illumination and display devices capable of producing light of varied spectral content. The intensity of such a device may be controlled by changing the intensities of the device's individual emitters, and the spectral content of light produced by such a device may be controlled by changing the ratios of intensities of the device's different wavelength emitters.

Exemplary apparatus for controlling the spectral content of light produced by a solid-state illumination device is disclosed in U.S. Pat. Nos. 6,344,641, 6,448,550 and 6,507,159.

SUMMARY OF THE INVENTION

In one embodiment, a method comprises modulating ones of a plurality of drive currents in accordance with a plurality of unique modulation sequences. The modulated drive currents are then applied to a plurality of light emitters. Thereafter, a stream of optical measurements is obtained from a photosensor that is positioned to sense the aggregate light emitted by the light emitters. The stream of optical measurements is then correlated with the unique modulation sequences to extract optical responses to each of the plurality of drive currents. Finally, each drive current is regulated based on its relationship to its corresponding optical response.

In another embodiment, apparatus comprises a plurality of light emitters, a photosensor, and a control system. The photosensor is positioned to sense the aggregate light emitted by the light emitters. The control system 1) modulates ones of a plurality of drive currents in accordance with a plurality of unique modulation sequences, 2) applies the modulated drive currents to the light emitters, 3) correlates a stream of optical measurements taken by the photosensor with the unique modulation sequences to extract optical responses to each of the plurality of drive currents, and 4) regulates each drive current based on its relationship to its corresponding optical response.

In yet another embodiment, apparatus comprises a plurality of light emitters, a photosensor, and a control system. The photosensor is positioned to sense the aggregate light emitted by the light emitters. The control system 1) applies a plurality of drive currents to the light emitters, 2) periodically alters one of the drive currents by a predetermined amount for a predetermined time, 3) for each drive current alteration, obtains readings from the photosensor with and without the drive current alteration, and 4) regulates each drive current based on its relationship to its corresponding photosensor readings.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
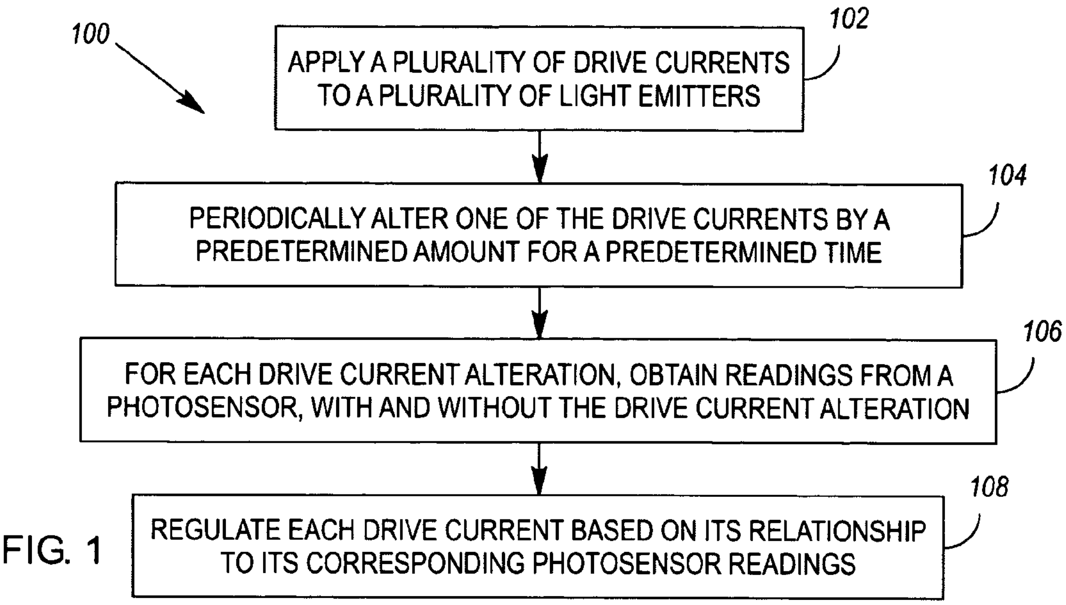
FIG. 1 illustrates a first exemplary method for regulating the drive currents of a plurality of light emitters.

As the number of individual light emitters in an illumination or display device increases, controlling the intensity of light produced by each individual emitter becomes more and more cumbersome. Without adequate control, temperature and aging effects can lead to the intensities of some emitters drifting from what is desired. In a monochromatic device, drifts in emitter intensities can result in changes in light intensity across the illumination device. In a polychromatic device, drifts in emitter intensities can result in both 1) changes in light intensity across the device, as well as 2) changes in spectral content across the device. Also, in a display device, drifts in individual emitter intensities can result in image artifacts superimposed on the desired image.

By way of example, the following description will focus primarily on illumination and display devices comprised of solid-state light emitters (e.g., LEDs). However, the principles disclosed below are also applicable to other types of light emitters (e.g., gas discharge lamps).

One way to control the intensities of light emitters in an illumination or display device is to use a different photosensor to sense the light produced by each of the device's emitters. However, this can become unwieldy and costly as the number of light emitters increases. Furthermore, as a result of the light produced by a given emitter mixing with the light produced by other emitters (which is often desirable), it is often difficult to position a photosensor so that it only senses the light produced by a single emitter.

In some cases, a single photosensor (or single group of photosensors for measuring different wavelengths of light) is used to measure the aggregate light output (i.e., intensity) of a plurality of light emitters. Adjustments to the intensities of the light emitters are then made on a group basis. So long as all of the light emitters in the group are manufactured within close tolerances, and so long as all of the emitters respond to temperature changes, age and other factors in a similar manner, adjusting the spectral content of the light emitters on a group basis may be effective. However, if the light output to drive current relationships of two or more nominally identical emitters exhibit marked differences, then group control of the emitters results in substandard operation of the illumination or display device of which the emitters form a part.

In a system utilizing only a single photosensor (or a single group of photosensors for measuring different wavelengths of light), individualized controls for each of a plurality of light emitters may be derived from the sensor's output by periodically turning off one of the emitters while continuing to monitor the aggregate light output of the emitters. By using a differential measurement, with and without the emitter, the contribution of the affected emitter can be computed. However, this has the effect of causing an abrupt change in the aggregate light output of the device, and can cause a visible flicker in the light output of the device. This flicker may be especially noticeable in small to moderate size arrays of light emitters. And, in the case of a display, periodically removing one of its emitters from normal operation may appear as an unacceptable image defect.

One way to reduce the flicker caused by turning a light emitter off and on is to temporarily increase the light output of the emitter immediately before and after it is turned off. Flicker is reduced because a human eye tends to average short periods of increased and no light output. However, to accomplish such a method, the emitter usually has to be capable of producing substantially more than its nominal light output. This can lead to lower power efficiency and emitter overdesign. Without overdesign, the periodic substantial increase in emitter light output can lead to premature emitter aging, or even failure.

Figure 2:
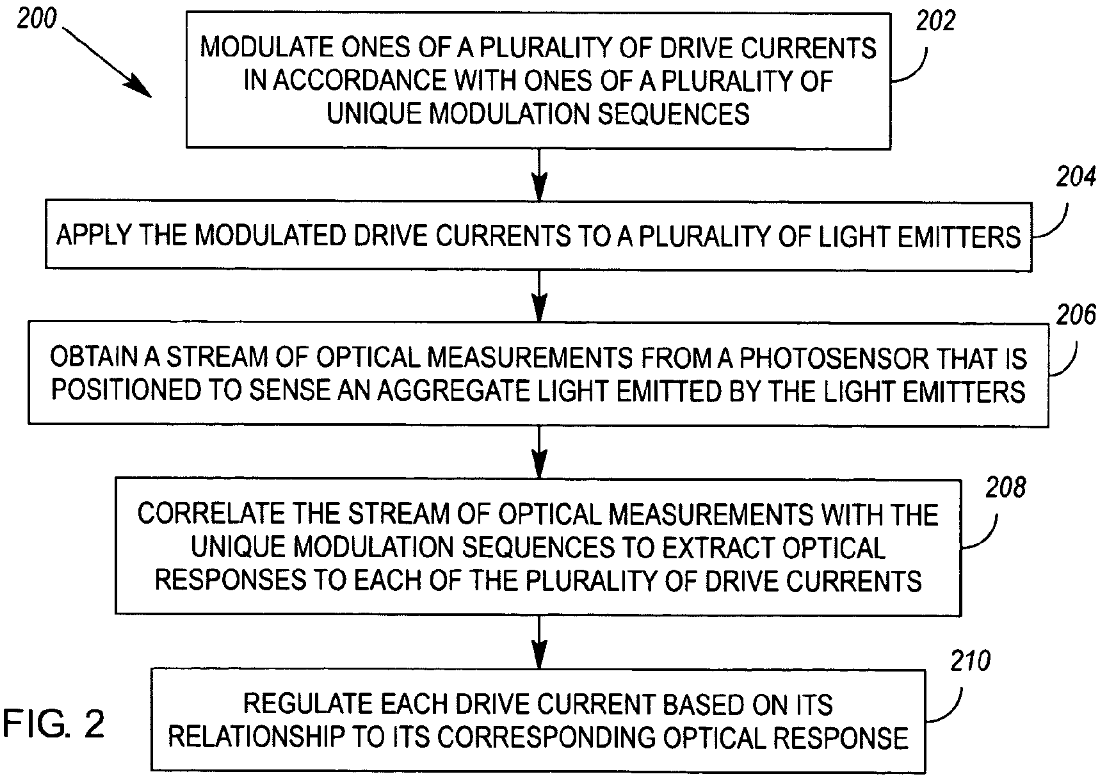
FIG. 2 illustrates a second exemplary method for regulating the drive currents of a plurality of light emitters.
Figure 3:
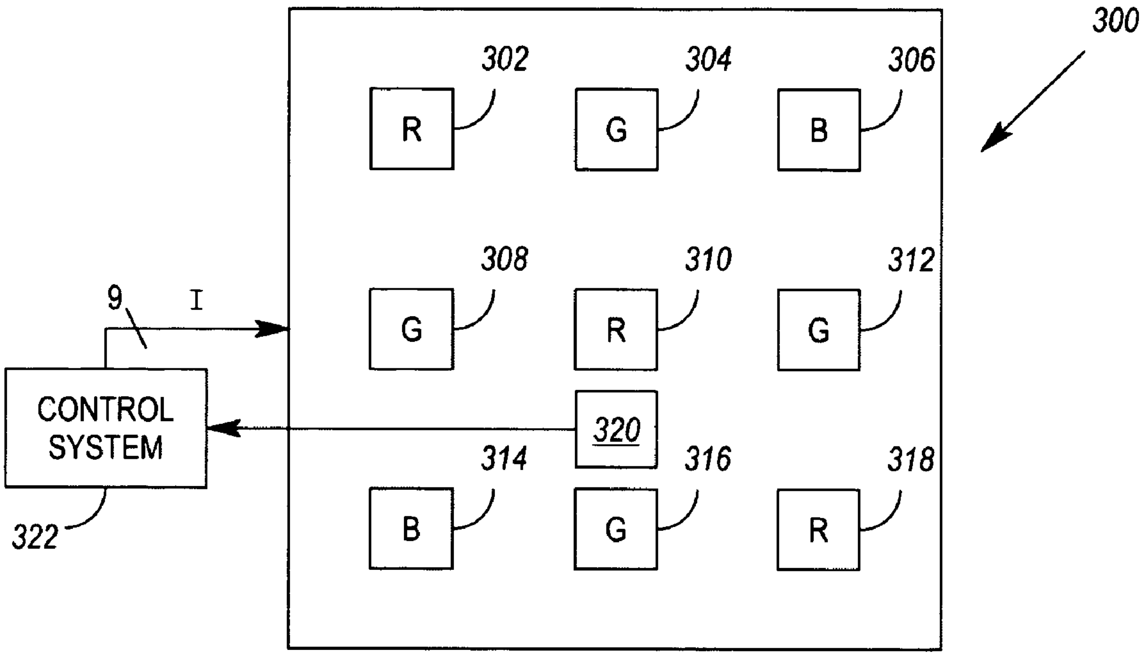
FIG. 3 illustrates exemplary apparatus for implementing the method shown in FIG. 1 or FIG. 2.

In light of the above methods for controlling the intensities of light emitters in an illumination or display device, methods and apparatus that address some or all of the disadvantages of these methods would be desirable. To this end, FIGS. 1-3 illustrate new methods and apparatus for regulating the drive currents of a plurality of solid-state light emitters.

As alluded to above, the light output (L) of a solid-state light emitter is generally related to its drive current (I). However, as a result of temperature, aging and other effects, an emitter's L/I relationship can sometimes change. A portion of an emitter's L/I relationship that is especially useful in characterizing the operation of the emitter is its dynamic L/I relationship, or the derivative of the emitter's L/I transfer curve about its nominal operating current. Temperature, aging and other effects cause the slope of the L/I curve to vary, and hence an assessment of an emitter's dynamic L/I relationship can be used to estimate its operating characteristics.

In light of the usefulness of an emitter's dynamic L/I relationship, FIG. 1 illustrates a first exemplary method 100 for regulating the drive currents of a plurality of solid-state light emitters. In accordance with the method 100, a plurality of drive currents is applied 102 to a plurality of light emitters. In one embodiment, each drive current is applied to a different one of the light emitters. In another embodiment, each drive current is applied to a subset of the light emitters. Periodically, one of the drive currents is altered 104 (e.g., reduced or increased) by a predetermined amount (e.g., 2% of the drive current's nominal operating value) for a predetermined time. By way of example, the alterations in drive currents may be undertaken on a rotating or random basis amongst the different drive currents. For each drive current alteration, readings with and without the drive current alteration are obtained 106 from a photosensor that is positioned to sense the aggregate light emitted by the light emitters. As defined herein, "aggregate light" is a mixed light that is influenced by each of a plurality of light emitters. However, "aggregate light" need not always comprise all of the light emitted by the plurality of light emitters.

The method 100 then continues with the regulation 108 of each drive current based on its relationship to its corresponding photosensor readings. In some cases, this regulation may be performed in response to a calculation of an emitter's dynamic impedance about its nominal operating current. In other cases, the emitter's dynamic impedance need not be calculated, and the emitter's drive current and photosensor readings may simply be used to look up a drive current or drive current adjustment.

By only partially reducing a light emitter's drive current (e.g., reducing it by about two percent (2%) or less), the need to overdrive the light emitter before and after an alteration in its drive current can be avoided.

FIG. 3 shows an exemplary illumination device, display device or portion of a display device 300 in which the method 100 may be implemented. By way of example, the device 300 comprises a plurality of solid-state light emitters 302-318, and a photosensor 320 that is positioned to sense the aggregate light that is emitted by the light emitters 302-318. As shown, the emitters 302-318 may emit light of different wavelengths (e.g., red (R), green (G) and blue (B) light). However, the emitters 302-318 could alternately emit light of more or fewer wavelengths, and could even emit a monochromatic light. In the latter case, the method 100 can only be used to ensure a uniform intensity of the emitters across the device 300 (i.e., since the spectral content of the device would be fixed by the device's monochromatic emitters).

The device 300 further comprises a control system 322. The control system 322 implements the method 100, and possibly other control functions for the device 300. Although the control system 322 is shown to be a single unit, the electronics of the control system 322 could alternately be distributed amongst various subsystems of the device 300.

FIG. 2 illustrates a second exemplary method 200 for regulating the drive currents of a plurality of solid-state light emitters. In accordance with the method 200, ones of a plurality of drive currents are modulated 202 in accordance with a pilot tone modulated by ones of a plurality of unique modulation sequences. Preferably, the unique modulation sequences are orthogonal to one another, such that a cross-correlation of the modulation sequences is zero, and only the auto-correlation of a modulation sequence is non-zero.

The method 200 continues with the application 204 of the modulated drive currents to a plurality of light emitters. In one embodiment, each drive current is applied to a different one of the light emitters. In another embodiment, each drive current is applied to a subset of the light emitters. Thereafter, a stream of optical measurements is obtained 206 from a photosensor that is positioned to sense the aggregate light emitted by the light emitters. The stream of optical measurements is then correlated 208 with the unique modulation sequences to extract optical responses to each of the plurality of drive currents. During correlation, optical measurements that do not correlate with a particular modulation sequence are perceived as aggregate "noise" and are ignored.

After correlating the photosensor's measurement stream with the unique modulation sequences, each of the drive currents is regulated 210 based on its relationship to its corresponding optical response. In some cases, this regulation may be performed in response to a calculation of an emitter's dynamic impedance about its nominal operating current. In other cases, the emitter's dynamic impedance need not be calculated, and the emitter's drive current and optical response may simply be used to look up a drive current or drive current adjustment.

In one embodiment of the method 200, the unique modulation sequences are based on pseudo-random bit sequences (PRBSs) that all have a mean of a nominal value and periodically repeat. By way of example, the PRBS sequences may be Haddamarand-Walsh sequences or Gold sequences. The amplitudes of the PRBS modulation sequences can be quite small, as the correlation of a response with a PRBS sequence typically provides a high coding gain.

As previously mentioned, the unique modulation sequences may be applied to their corresponding drive currents by modulating the drive currents with a pilot tone that, for each drive current, is modulated by a different one of the unique sequences. Alternately, the pilot tone need not be used. However, when not using the pilot tone, the detected signal after correlation typically comprises a DC value, the magnitude of which is more difficult to determine than the amplitude of a pilot tone. By way of example, the pilot tone may be a periodic signal such as a low amplitude square wave or sine wave.

In one embodiment, the pilot tone, in combination with each unique modulation sequence, has an amplitude that is within two percent (2%) of the nominal operating value of the drive current to which it is applied.

Like the method 100, the method 200 may also be implemented in the illumination or display device 300 shown in FIG. 3. When configured to implement the method 200, the control system 322 may receive a stream of optical measurements from the photosensor 320 and extract optical responses from the stream in a serial fashion (i.e., by correlating a first modulation sequence with a first portion of the stream, by correlating a second modulation sequence with a second portion of the stream, and so on). In another embodiment, the control system 322 extracts optical responses in parallel (e.g., by splitting or saving the stream of optical measurements received from the photosensor 320).

Because a modulation sequence such as a PRBS can operate at a relatively high bit rate, and because good noise immunity can be conferred by a low-amplitude PRBS modulation sequence, the method 300 can be used on a continuous basis, with little or no visual impact on an illumination or display device 300.

The device 300 disclosed herein has various applications. In one embodiment, the device 300 may serve as a backlight for a liquid crystal display (LCD). In another embodiment, the device 300 may serve as general-purpose or special-purpose lighting (e.g., mood lighting or a cosmetics mirror light). In yet another embodiment, the device 300 may form part or all of a display.

What is claimed is:

1. An apparatus, comprising:

a plurality of light emitters;

at least one photosensor positioned to sense an aggregate light emitted by the light emitters; and a control system to: (i) modulate a plurality of drive currents in accordance with at least one modulation sequence for a predetermined period of time, (ii) apply the modulated drive currents to the light emitters during the predetermined period of time, (iii) correlate a stream of optical measurements taken by the at least one photosensor during the predetermined period of time, and before or after such predetermined period of time, with the at least one modulation sequence to extract optical responses to each or a subset of the plurality of drive currents, and (iv) regulate each drive current or subset of drive currents based on their relationships to their corresponding optical responses.

2. The apparatus of claim 1, wherein the light emitters comprise emitters that emit light of different wavelengths.

3. The apparatus of claim 1, wherein the light emitters are solid-state light emitters.

4. The apparatus of claim 3, wherein the light emitters are light emitting diodes (LEDs).

5. The apparatus of claim 1, wherein the plurality of light emitters forms a backlight for a liquid crystal display (LCD).

6. The apparatus of claim 1, wherein the plurality of light emitters forms a display.

7. The apparatus of claim 1, wherein the at least one modulation sequence is based on pseudo-random bit sequences (PRBSs).

8. The apparatus of claim 1, wherein the at least one modulation sequence comprises a first modulation sequence and a second modulation sequence, the first and second modulation sequences being orthogonal to one another.

9. The apparatus of claim 1, wherein the at least one modulation sequence is based on a Haddamarand-Walsh sequence.

10. The apparatus of claim 1, wherein the at least one modulation sequence is based on a Gold sequence.

11. The apparatus of claim 1, wherein the at least one modulation sequence is periodic in nature.

12. The apparatus of claim 1, wherein the control system modulates the plurality of drive currents with a pilot tone that is modulated by the at least one modulation sequence.

13. The apparatus of claim 12, wherein the pilot tone, in combination with the at least one modulation sequence, has an amplitude that is within two percent (2%) of the nominal operating value of the drive current to which it is applied.

14. The apparatus of claim 1, wherein the control system applies each drive current to a different one of the light emitters.

15. The apparatus of claim 1, wherein the control system applies each drive current to a subset of the light emitters.

16. The apparatus of claim 1, wherein the control system extracts the optical responses serially.

17. The apparatus of claim 1, wherein the control system extracts the optical responses in parallel.

18. A method, comprising:

modulating for a predetermined period of time a plurality of drive currents in accordance with at least one modulation sequence;

applying the modulated drive currents to a plurality of light emitters for the predetermined period of time;

obtaining, during the predetermined period of time, and before or after such predetermined period of time, a stream of optical measurements from at least one photosensor positioned to sense an aggregate light emitted by the light emitters;

correlating the stream of optical measurements with the at least one modulation sequence to extract optical responses for each or a subset of the plurality of drive currents; and regulating each drive current or each subset of drive currents based on their relationship to their corresponding optical responses.

19. The method of claim 18, wherein the plurality of drive currents are modulated in accordance with at least one modulation sequence by modulating the drive currents with a pilot tone that is modulated by the at least one modulation sequence.

20. The method of claim 18, wherein the at least one modulation sequence is orthogonal to pseudo-random bit sequences (PRBSs).

* * * * *